United States Patent
See et al.

(10) Patent No.: US 7,555,562 B2
(45) Date of Patent: Jun. 30, 2009

(54) METHOD AND APPARATUS FOR MIRRORING TRAFFIC OVER A NETWORK

(75) Inventors: Micahael See, Chapel Hill, NC (US); Jagjeet Bhatia, Simi Valley, CA (US)

(73) Assignee: Alcatel Lucent, Paris (FR)

( * ) Notice: Subject to any disclaimer, the term of this patent is extended or adjusted under 35 U.S.C. 154(b) by 580 days.

(21) Appl. No.: 11/291,347

(22) Filed: Dec. 1, 2005

(65) Prior Publication Data

US 2006/0143300 A1    Jun. 29, 2006

Related U.S. Application Data

(63) Continuation-in-part of application No. 10/465,070, filed on Jun. 18, 2003, now abandoned.

(60) Provisional application No. 60/392,116, filed on Jun. 27, 2002.

(51) Int. Cl.
*G06F 15/173*    (2006.01)
*G06F 15/16*    (2006.01)

(52) U.S. Cl. .................. 709/240; 709/231; 709/238; 709/239; 709/245

(58) Field of Classification Search ............... 709/231, 709/238–240, 245
See application file for complete search history.

(56) References Cited

U.S. PATENT DOCUMENTS

| | | | | |
|---|---|---|---|---|
| 5,394,402 | A * | 2/1995 | Ross | 370/402 |
| 5,959,989 | A * | 9/1999 | Gleeson et al. | 370/390 |
| 6,041,042 | A | 3/2000 | Bussiere | |
| 6,847,620 | B1 * | 1/2005 | Meier | 370/328 |
| 6,894,999 | B1 * | 5/2005 | Acharya | 370/352 |
| 7,047,314 | B2 * | 5/2006 | Sato et al. | 709/238 |
| 7,155,494 | B2 * | 12/2006 | Czeiger et al. | 709/218 |
| 2002/0075809 | A1 | 6/2002 | Phaal | |

* cited by examiner

*Primary Examiner*—Ario Etienne
*Assistant Examiner*—Hussein El Chanti (57) ABSTRACT

A method and apparatus for mirroring traffic from a first network device to a second network device are disclosed. The method includes the selecting of one or more ingress frames from an ingress stream using mirror classification criteria; duplicating the one or more ingress frames; appending a mirrored flow encapsulation header with a virtual local area network tag; transmitting the duplicate frames with tags from the first network device to the second network device; and removing the mirrored flow encapsulation header at the target network device to regenerate the ingress frames originally received at the first network device. The ingress frames may then be forwarded to an egress port of the second network device and analyzed by a traffic analysis tool, for example. With the invention, the traffic received at the first network device may be analyzed remotely.

16 Claims, 7 Drawing Sheets

METHOD AND APPARATUS FOR MIRRORING TRAFFIC OVER A NETWORK

CROSS REFERENCE TO RELATED APPLICATION

This application is a continuation-in-part application of U.S. Non-Provisional Patent application Ser. No. 10/465,070, filed Jun. 18, 2003 now abandoned which claims benefit from U.S. Provisional Patent Application Ser. No. 60/392,116 filed Jun. 27, 2002 which are hereby incorporated herein by reference in their entirety for all purposes.

FIELD OF INVENTION

The invention generally relates to a system and method for mirroring traffic received at a first network device to a second network device. In particular, the invention relates to a method and system for conveying, selecting and encapsulating packets at the first device such that the packets may be regenerated at a second device remotely located in a network with little or no modification to the information contained therein.

BACKGROUND

Network administrators that manage and maintain enterprise networks sometimes have a need to monitor traffic received at a particular node in the network. Contemporary routers and switch routers permit the administrator to define a class of traffic and cause that traffic to be directed to an egress port for purposes of performing network intrusion detection or recording the traffic, for example. The analysis, however, is necessarily performed by a traffic analysis tool or recording device directly coupled to the router or switch router. There is currently no means for the administrator to direct the traffic to another node where the necessary resources reside. The problem is especially problematic in enterprise and service provider networks, for example, where the traffic to be analyzed/recorded and the resources needed to analyze/record it are separated by large distances.

There is therefore a need for an apparatus and method for selecting and transmitting traffic in its original, unaltered form from a first node in the network to a second node where it may be analyzed or recorded. Such a system would overcome the need to locate the resources needed to analyze and record traffic in the immediate proximity of the device to be studied.

SUMMARY

The invention in the preferred embodiment comprises a traffic mirroring apparatus and method for duplicating and transmitting incoming packets received at a source network device to a target network device located anywhere in the network. The traffic mirroring method comprising the steps of duplicating a plurality of ingress packets received at the source network device, such that a plurality of duplicate packets are formed; encapsulating the plurality of duplicate packets with a mirrored flow encapsulation header, such that a plurality of mirrored flow encapsulation packets are formed; transmitting the plurality of mirrored flow encapsulation packets from the source network device to the target network device; and switching the plurality of ingress packets to the one or more nodes specified by the destination address information embedded therein.

Upon receipt at the target network device, the mirrored flow encapsulation packets are de-encapsulated by removing the mirrored flow encapsulation header. The resulting de-encapsulated packets that are recovered are substantially identical to the ingress packets as received by the source network device. The substantially identical copy of the said plurality of ingress packets may then be transmitted to and processed by an analysis device connected to the target device as if the analysis tool where actually connected directly to the source network device.

In some embodiments, the mirrored flow encapsulation header comprises a network layer encapsulation header. The network layer encapsulation header is, in the preferred embodiment, an IP header that comprises the destination address of the target network device, while alternative embodiments employ a label such as a MPLS label The ingress packets to which the network layer encapsulation header is attached preferably retains its own network layer encapsulation header including the Internet Protocol (IP) and Media Access Control (MAC) destination addresses used to convey the ingress packet to the source network device. The IP destination address may be that of the intended recipient, i.e. a destination node reachable through the source network device, such as the source network device or other node.

Ingress packets are preferably identified in the ingress stream and selected for processing using mirror classification criteria. The mirror classification criteria used to select include physical ingress and egress port number on the source network device, OSI model layer 2 source address, OSI model layer 2 destination address, OSI model layer 3 source address, OSI model layer 3 destination address, virtual local area network (VLAN) tag, MPLS labels, protocol, application, and quality of service (QoS) parameters.

The invention in other embodiments is a source network device for transmitting a substantially identical copy of one or more qualified packets to a target network device. The source network device preferably comprises a flow resolution logic for selecting one or more qualified packets from an ingress packet stream; a replicator for duplicating the one or more qualified packets, such that one or more duplicate packets is formed; an encapsulation module for appending a mirrored flow encapsulation header to each of the one or more duplicate packets, such that one or more mirrored flow encapsulation packets is formed; and a queue memory for buffering the one or more mirrored flow encapsulation packets until the mirrored flow encapsulation packets are transmitted to the target network device. In some embodiments, the source network device is a switching device for performing layer 2 and layer 3 packet processing.

In some embodiments, the mirrored flow encapsulation header comprises a network layer encapsulation header including the destination address of the target network device. In alternative embodiments, however, the encapsulation header comprises a label such as an MPLS label used to provide OSI layer 2 switching of the mirrored traffic from the source network device to the target network device. The qualified packets preferably retain the network layer encapsulation header including an IP destination address of the intended recipient or source network device, for example.

The invention in other embodiments is a target network device for receiving one or more mirrored flow encapsulation packets from a source network device. Each of the mirrored flow encapsulation packets preferably includes a mirrored flow encapsulation header and a qualified packet. The target network device preferably comprises a flow resolution logic for selecting one or more mirrored flow encapsulation packets from an ingress packet stream; and a de-encapsulation module for removing the mirrored flow encapsulation header from each of the one or more mirrored flow encapsulation packets. With the invention, qualified packets substantially identical to that received at the source network device are regenerated at the target network device where they may be analyzed, recorded or otherwise processed. In some embodiments, the target network device is a switching device for performing layer 2 and layer 3 packet processing.

In some embodiments, the target network device further includes one or more queue memory devices for buffering each qualified packet until the qualified packet is transmitted to an egress port of the target network device. The egress port to which each qualified packet is distributed is preferably designated by a network administrator, and is not controlled by the original destination addressing information in the network layer or data link layer encapsulation headers.

The invention in the some embodiments features a traffic mirroring method comprising the steps of receiving an ingress packet, duplicating the ingress packet, such that a duplicate packet is formed; encapsulating the duplicate packet with a mirrored flow header; and transmitting, using information in the mirrored flow header, the duplicate packet from a first network node, e.g. a source network device, to a second network node, e.g. a target network device.

The invention in another embodiment features a traffic mirroring network which comprises a first network node interconnected to a second network node, wherein the first network node receives an ingress packet; duplicates the ingress packet such that a duplicate packet is formed; encapsulates the duplicate packet with a mirrored flow header, such that a mirrored flow packet is formed; and transmits, using information in the mirrored flow header, the duplicate packet from a first network node to the second network node.

Upon receipt at the second network node, the mirrored flow packet is de-encapsulated by removing the mirrored flow header. The resulting de-encapsulated packet that is recovered is substantially identical to the ingress packet. The de-encapsulated packet may then be transmitted to and processed by an analysis device connected to the second network node as if the analysis tool were actually connected directly to the first network node.

In some embodiments, the mirrored flow header comprises a network layer encapsulation header. The network layer encapsulation header is, in the preferred embodiment, an IP header that comprises the IP destination address of the second network node, while alternative embodiments employ a label such as an MPLS label. The ingress packet to which the network layer encapsulation header is attached preferably retains its own network layer header including the IP and MAC destination addresses used to convey the ingress packet to the intended recipient, i.e. a destination node reachable through the first network node, such as the first network node itself or another network node.

The ingress packet is preferably classified as part of a mirrored flow using mirror classification criteria. The mirror classification criteria include, for example, one or more of ingress port number, egress port number, source MAC address, destination MAC address, source IP address, destination IP address, VLAN tag, MPLS label, protocol type, application type, and quality of service parameters.

The invention in other embodiments features a network node comprising an ingress module for receiving a packet on an input port. A classification module for identifying the packet as belonging to a mirrored flow; a replication module for duplicating the packet, such that a duplicate packet is formed; an encapsulation module for appending a mirrored flow header to the duplicate packet; a memory for temporarily storing the duplicate packet; and an egress module for transmitting, using information in the mirrored flow header, the duplicate packet on an output port. In some embodiments, the network node is a switching device for performing layer 2 and layer 3 packet processing.

The invention in other embodiments is a network node for receiving a duplicate packet. The duplicate packet preferably includes a mirrored flow header. The network node preferably comprises an ingress module for classifying a packet from an ingress packet stream as belonging to a mirrored flow; and a de-encapsulation module for removing the mirrored flow header from the duplicate packet. With the invention, duplicates are regenerated at the target network device where they may be analyzed, recorded or otherwise processed. In some embodiments, the network node is a switching device for performing layer 2 and layer 3 packet processing.

In some embodiments, the network node further includes a memory for storing the de-capsulated duplicate packet until the de-capsulated duplicate packet is transmitted to an egress port of the network node. The egress port to which the de-capsulated duplicate packet is distributed is selected independently of any addressing information in the duplicate packet.

In some embodiments, the invention teaches a system and method for mirroring one or more flows from one or more source network devices to one or more target network devices using a tag such as a VLAN tag, used to forward mirrored frames within a local area network, for example. The method may include the steps of receiving ingress frames at the source network device; generating duplicates frames of the ingress frames at the source network device; appending a VLAN tag to the duplicate frames; transmitting ingress frames from the source network device based on the address, preferably the destination address, in the frame while transmitting the duplicate frames with the VLAN tag based on the VLAN tag; receiving the duplicate frames with the VLAN tag at one or more target network devices associated with the VLAN tag; and removing the VLAN tag from the at least one duplicate frame to regenerate a substantially identical copy the ingress frames originally received at the source network device. In the preferred embodiment, the VLAN tag used to mirror the frames is an 802.1Q tag having a VLAN identifier reserved for transmission of mirrored flows. The source network device may be one of a plurality of source network devices adapted to concurrently mirror a plurality of flows in the same local area network. Similarly, the target network device may be one of a plurality of network devices adapted to concurrently receive mirrored flows in the same local area network. The mirroring operations of the source and target network devices occur concurrently with convention switching and routing operations.

BRIEF DESCRIPTION OF THE DRAWINGS

The present invention is illustrated by way of example and not limitation in the figures of the accompanying drawings, and in which.

DETAILED DESCRIPTION

Figure 1:
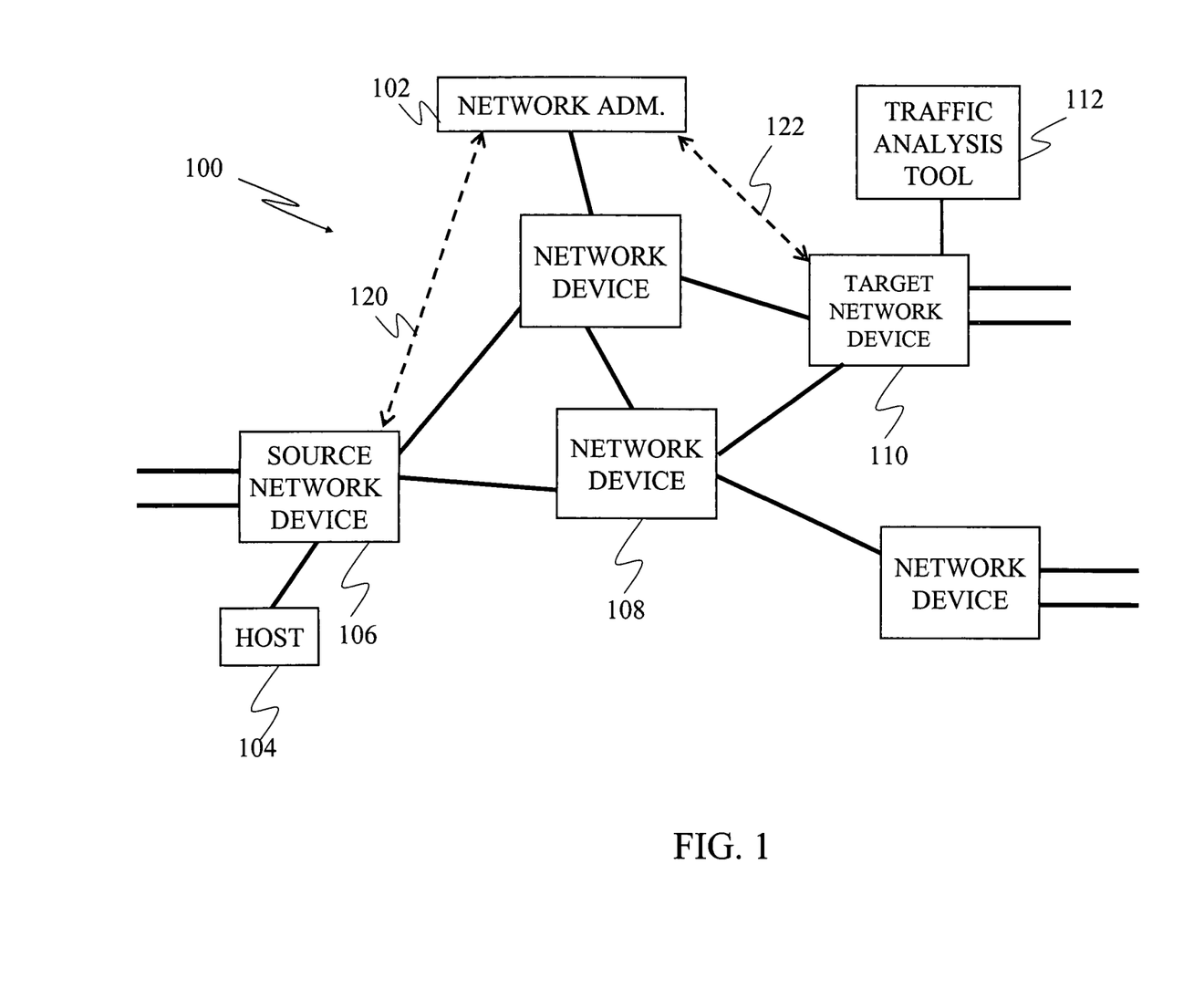
FIG. 1 is a network over which the present invention may be used to transmit mirrored traffic from a source network device to a target network device, according to the preferred embodiment of the present invention.

Referring to FIG. 1, a distributed network with which the present invention may be implemented is illustrated. The network 100 may be the Internet, an intranet, a local area network (LAN), a wide area network (WAN), a metropolitan area network (MAN), or a combination thereof, for example. The network 100 is comprised of a plurality of network devices, one or more host devices, and a network administrator operatively coupled by means of wired, wireless, and or optical connections. The network devices are generally capable of layer 2 and or layer 3 switching operations as defined in the OSI reference model. In the preferred embodiment, the layer 2 protocol may be selected from the group comprising Ethernet, Token Ring, and Fiber Distributed Data Interface (FDDI), while the layer 3 may be selected from the group comprising the Internet Protocol (IP), Internetwork Packet Exchange (IPX), and APPLETALK of Apple Computer, Inc., Cupertino, Calif.

A first host 104 is connected to the network 100 by means of a first network device, source network device (SND) 106. A network administrator 102 with a network management tool, for example, is in direct or indirect communication with the SND 106 as indicated by the communication link 120. The network 100 may further include a traffic analysis tool 112, for example, connected to a second network device, target network device (TND) 110, to which a network administrator such as network administrator 102, for example, has management privileges. The SND 106 and the TND 110 are preferably packet switching devices selected from the group comprising bridges, switches, routers, and switch routers also known as multi-layer switches. The SND 106 is operably coupled to the TND 110 either directly or indirectly by means of one or more intermediate or transit network devices including one or more bridges, switches, routers, and switch routers. The host 104 may be any device for generating traffic which may include a workstation, server, personal computer, local area network (LAN), VoIP network phone, or Internet appliance, for example. The source network device, second network device generally, or both are network nodes or other addressable entity embodied in a processor, computer, or other network appliance.

As with other prior art systems, the SND 106 is configured such that the network administrator 102 can direct traffic received on a specific port of the device to be reproduced (or mirrored) on another port in the given network device. Unlike the prior art, however, the present embodiment of the SND 106 may be configured to direct a copy of the traffic to another network device without altering the contents including the Layer 2 and Layer 3 addressing information of the packets as received by original network device. The present invention may therefore be used to transmit traffic having the original header information including the source address from one device to another where the traffic may be analyzed using a traffic analysis tool, for example. In the preferred embodiment, select traffic is encapsulated at a source network device with a temporary header including address information allowing the traffic to be forwarded through multiple network devices to a target network device anywhere in the network 100.

According to the preferred embodiment of the present invention, the traffic at the SND 106 may be delivered to another suitably configured device anywhere in the network 100 so that the original, unmodified traffic may be analyzed, monitored, or otherwise processed. In the preferred embodiment, the traffic forwarded from the SND 106 to the TND 110 is referred to herein as "mirrored traffic" or "mirrored flow," and is comprised of mirrored protocol data units (PDUs) including mirrored packets, for example. A mirrored packet includes a substantially-identical duplicate of the original packet received at the SND 106, which need not be co-located with the traffic analysis tool 112 used to analyze the mirrored flow.

The traffic identified as the mirrored flow at the SND 106 may originate from one or more designated ingress ports, be designated for one or more egress ports, or qualify as a subset of the traffic flow, a "conversation," that satisfies a particular rule set defined by the administrator 102. After the mirrored traffic is delivered to the TND 110, the traffic may be analyzed internally or by an end device, such as traffic analysis tool 112. Using the present invention, the mirrored traffic originating at the SND 104 may be remotely processed at the TND 110 without any alteration of the information contained therein, and without the need of the administrator being co-located in the immediate proximity of the SND 106, TND 110, or traffic analysis tool 112.

Note that the terms "source network device" and "target network device" are defined with respect to the direction of mirrored flow, which may be transmitted between any compatible routers, switches, or switch routers. One skilled in the art will also recognize that the SND 106 described in detail below may also serve as the target network device to one or more other mirrored flows, while the TND 110 described in detail below may also serve as the source network device to one or more other mirrored flows.

Figure 2:
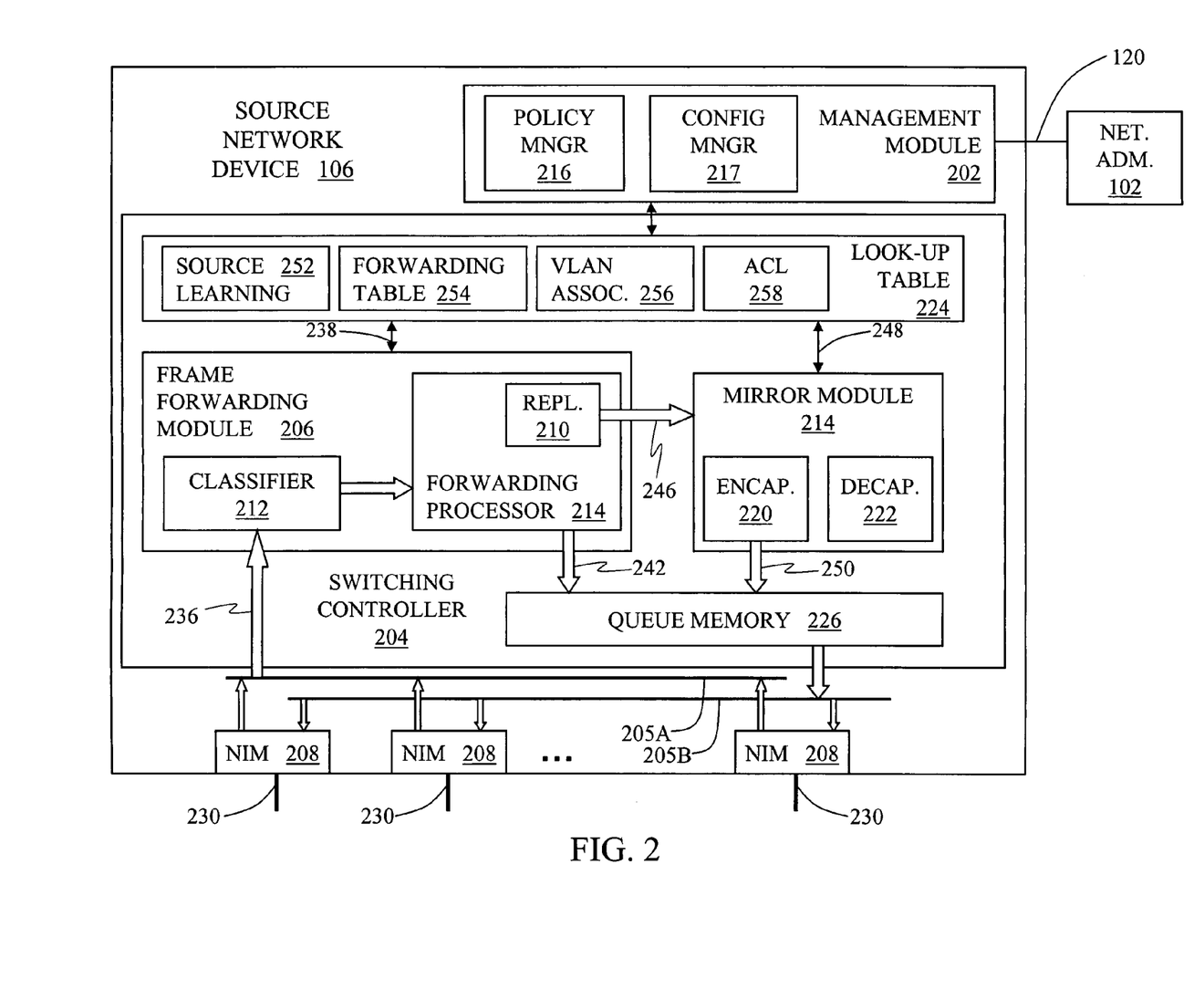
FIG. 2 is a source network device at which mirrored traffic is generated according to the preferred embodiment of the present invention.

A source network device at which mirrored traffic is generated according to the preferred embodiment is illustrated in FIG. 2. The SND 106 preferably includes a plurality of ports 230, one or more network interface modules 208, one or more switching controllers 206, a management module 202, and one or more instances of queue memory 226. In general, ingress packets are received on one or more ports 230, the packets processed in accordance with forwarding rules, and the egress packets processed for transmission from one or more ports. For purposes of this disclosure, the term "ingress packets" as used herein generally refer to the packets received as part of an ingress flow or stream by a given network device prior to internal modification of the packets by the processes necessary to switch, route, or mirror those packets.

The NIMs 208 preferably include one or more physical layer interfaces and media access control (MAC) interfaces adapted to exchange PDUs, e.g., Ethernet frames, via network communications links. The ingress PDUs are conveyed from the plurality of NIMs 208 to the switching controller 204 by means of one or more ingress data buses 205A.

Similarly, the egress PDUs are transmitted from the switching controller 206 to the plurality of NIMs 208 via one or more egress data buses 205B.

The ingress packets 236 are then passed from the NIMs 208 to the switching controller 204. The switching controller 204 comprises a frame forwarding module 206 that generally processes the ingress packets for layer 2 switching or layer 3 routing, a lookup cache 224, and a mirror module 214 that processes "qualified packets" for mirroring. The frame forwarding module 206 in turn comprises a classifier 212 and a forwarding processors 214 with a PDU replicator 210. The classifier 212 receives ingress PDUs from the data bus 205A, inspects one or more fields of the PDUs, classifies the PDUs into one of a plurality of flows based on policies in the look-up table 224, and retrieves forwarding information 238 from the forwarding table 254 retained in high-speed memory.

The lookup cache 224 preferably includes one or more memory devices including a source learning table 252 to associated a port with the source address of the incoming packets, a forwarding table 254 header information to identify the PDU flows and generate the outgoing packet header in accordance with a networking protocol such as Transmission Control Protocol/Internet Protocol (TCP/IP), a VLAN association table 256 including rules for appending and removing VLAN tags, and an access control list (ACL) 258 including rules for filtering inbound PDUs, for example. The rules sets used to process incoming traffic more generally, are defined by the policy manager 216 or by the network administrator 102 by means of the configuration manager 217.

The processing at the forwarding processors 214 preferably includes the packet modification necessary to send and receive standard bridge traffic, route network layer traffic, and redirect mirrored traffic between source network devices and target network device. Such modifications may include changes to the layer 2 source address, layer 2 destination address, and time-to-live (TTL) field, for example. After the appropriate modifications are made at the forwarding processors 214, the PDUs undergoing standard bridging and routing are forwarded to queue memory 226. This stream of packets 242 is forwarded to queue memory 224 where the individual "egress packets" are buffered in the appropriate queue prior to being transmitted out the designated egress port of the SND 106 to the network nodes in accordance with the destination address or addresses provided therein. The egress stream 242 generally includes traffic comprised of packets that qualify for mirroring as well as those that do not.

Independent of the egress stream 242 that has undergone conventional packet processing, the frame forwarding module 206 tests for and identifies packets that need be mirrored from the SND 106 to one or more target network devices including TND 110. If an ingress packet satisfies "mirror classification criteria" prescribed in the policy manager 216 and made available in lookup cache 224, then a duplicate of the packet is generated at replicator 210. A duplicate packet preferably includes all the original addressing information contained in the ingress packet including the network encapsulation header, e.g. IP header, and the data link layer header, e.g. Ethernet header.

Duplicate packets 246 are forwarded from the forwarding processor 214 to the encapsulation module 220 of the mirror module 214. The mirror classification criteria may take the form of one or more rules that specify the traffic from an ingress port, traffic to an egress port, or any subset of thereof. A subset of the traffic on an ingress or egress port may be defined by any of a number of criteria including but not limited to port number, layer 2 source and destination address, VLAN tag, MPLS labels, layer 3 source and destination address, protocol application, or quality of service (QoS) parameter. Alternatively, all the traffic received on an ingress port(s) or transmitted on an egress port(s) could be selected for mirroring. The mirror classification criteria may also include one or more fields to label or otherwise identify mirrored traffic at a target device, as discussed below.

In the preferred embodiment, the duplicate packets 246 generated at replicator 210 are transmitted to the mirror module 214 concurrent to the stream of egress packets 242 forwarded according to conventional switching and routing mechanisms. As such, the traffic at the SND 106 may be remotely analyzed without disturbing any ongoing transmissions within the network 100.

Duplicate packets 246 that are forwarded to the mirror module 214 are generally processed by the encapsulation module 220 of the mirror module 214. Encapsulation refers to the process by which new addressing and or labeling information is added onto an existing, intact packet or substantially intact for purposes of transmitting the packet from the source network device to the target network device. In the first preferred embodiment, a new mirrored flow encapsulation (MFE) header is appended to front of the duplicate packet preceding any existing network headers such as an Ethernet header and an IP header present in the unmodified packet. In some embodiments, a new footer including a MFE frame check sequence (FCS) is also appended to the end of the duplicate packet.

The MFE header preferably includes a new destination address, i.e. the TND 110, and a new source address, i.e. the SND 106. The destination address may be included by means of a new network encapsulation header, e.g. IP header, and a new data link layer header, e.g. Ethernet header. The destination address, specified by the network administrator 102 via the configuration manager 217, is uploaded to the policy manager 216 and made available to the mirror module 214 by means of the lookup cache 224. The MFE FCS is calculated from the rest of the packet's data using a 32-bit cyclic-redundancy check (CRC-32) algorithm, for example.

The new packet including the MFE header is referred to herein as a MFE packet. The stream of MFE packets 250 is then forwarded to the queue memory where they are queued and buffered prior to being transmitted to the appropriated egress port in the direction of the TND 110. The MFE packets propagate towards the TND 110 by transit network devices such as switches and routers that make forwarding decisions based on the MFE header. The original header of the packet received at the source network device 106 is treated as part of the payload of the MFE packet.

Figure 3:
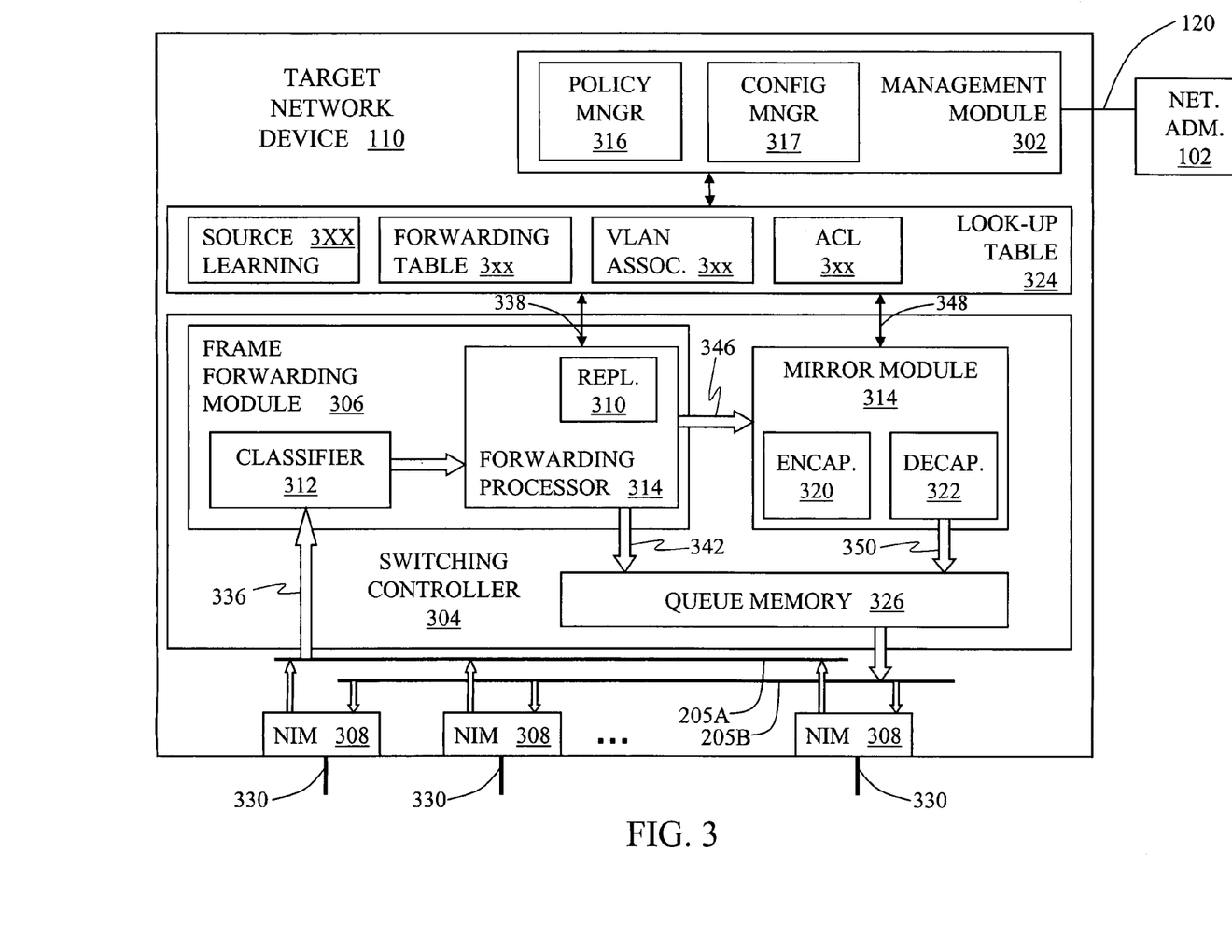
FIG. 3 is a target network device at which mirrored traffic is received and processed according to the preferred embodiment of the present invention.

After propagating through the network 100, the MFE packet or packets subsequently arrive at the target network device, TND 110 illustrated in FIG. 3. The TND 110 in the preferred embodiment is substantially similar to the SND 106, and preferably includes a plurality of ports 330, one or more switching controllers 304, a management module 302, and one or more instances of queue memory 326. The MFE packets and other non-mirrored traffic received on the plurality of ingress ports collectively constitute the ingress traffic. The ingress traffic 336 is forwarded from the NIMS 308 to the classifier 312 where the flow is identified for purposes of subsequent processing.

As described above, the classifier 312 consults one or more address tables in lookup cache 324 for forwarding information. In addition to the conventional destination address tables used for layer 2 switching and layer 3 routing, the lookup cache 324 identifies the MFE packets to be culled from the standard processing using "target classification criteria" in policy manager 316. The target classification criteria may take the form of one or more rules that may include the source address of the source network device 106, the port number of the mirrored traffic, the destination address of the target network device 110, and or another label used to uniquely identify mirrored traffic using a convention known to the source and target network devices.

With the exception of the MFE packets from a source network device such as SND 106, the classifier 312 preferably processes the incoming packets for layer 2 switching or layer 3 routing using the addressing tables in lookup cache 324. The resulting egress flow 342 is forwarded to queue memory 326 and out the appropriate egress port 330, consistent with the treatment in SND 106.

On the other hand, the MFE packets of the ingress stream 336 identified in classifier 312 using the target classification criteria are forwarded to the mirror module 314. In particular, the incoming MFE packets are transmitted to the de-encapsulation module 322 of the mirror module 314. At the de-encapsulation module 322, the MFE header is removed and the original, un-encapsulated packet received at the SND 106 regenerated. Using the egress port number provided by the network administrator 102 and retained in lookup cache 324, the un-encapsulated packet is pushed to the queue memory 326 where it is buffered until transmitted out a designated egress port 330. Thereafter, the PDUs originally received at the SND 106 may be processed by a traffic analysis tool 112, a device to store network traffic, or some other device, for example. The egress port used to output the mirrored flow is preferably specified by the network administrator 102 when configuring the mirrored flow. The TND 110 prevents the unencapsulated packet from being forwarded by the normal Layer 2 and Layer 3 processing to the original destination address.

The traffic analysis tool 112 may be any of a variety of tools used to analyze network traffic. These include but are not limited to: tools that display the addresses and contents of the packet to allow a network engineer to diagnose problems or mis-configuration in the network, tools that analyze traffic to identify attempts to hack into the network, tools that analyze traffic to determine if the security of the network or a device on the network has been compromised, and tools that simply record the contents of the packet onto a storage medium for later offline analysis.

In some embodiments, the MFE packets are switched from the SND 106 to the TND 110 using a label switched path (LSP) constructed using a multi-protocol label switching (MPLS) protocol such as a resource reservation setup protocol (RSVP) or label distribution protocol (LDP). The label is then incorporated into the MFE header, thereby permitting the MFE packet to be label switched through the network 100.

Figure 4:
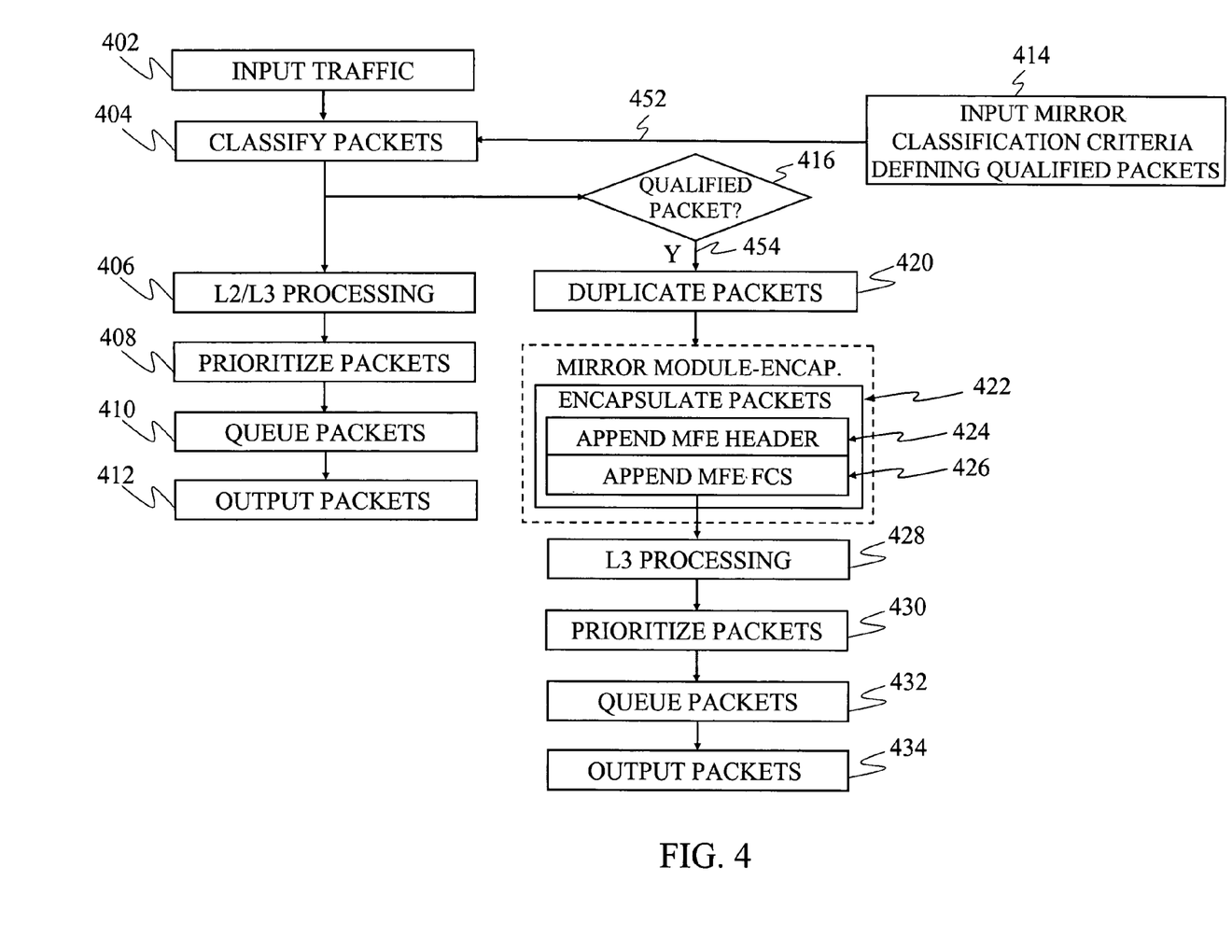
FIG. 4 is a method by which the source network device processes packets according to the preferred embodiment of the present invention.

Referring to FIG. 4, the method by which the source network device 106 processes packets according to the preferred embodiment is illustrated. A source network device, source network device 106 in the preferred embodiment, receives ingress traffic in step 402 from a plurality of ports. The ingress traffic comprises protocol data units (PDU) that are individually classified 404 in order to determine if the "mirror classification criteria" provided by the network administrator are satisfied. The mirror classification criteria 452 provided as input to the SND 106 and input 414 to define the traffic flow(s) to be mirrored to the target network device, TND 110. Packets that satisfy the mirror classification criteria 452 are referred to herein as "qualified packets" or "qualified traffic."

The mirror classification criteria 452 are used to define and the qualified packets and may include one or more of the following: incoming switch port number; egress switch port number, layer 2 source address; layer 2 destination address; VLAN tag; MPLS labels, QoS parameters; layer 3 source address, layer 3 destination address, protocol type, application and/or specific contents in the packet. The fields specified in classification criteria 452 are compared to the contents of the packet being processed. If all the fields specified in the classification criteria match the characteristics or contents of the packet, the packet is determined to be a qualified packet. One skilled in the art will appreciate that the SND 106 may also serves as a target network device for another mirrored flow, in which case the classification in step 404 will also identify and process those packets consistent with the process illustrated in FIG. 5 described below.

In general, all packets, irrespective of whether they are qualified packets, are conveyed to the switching controller 204 where they undergo the appropriate OSI model layer 2 or layer 3 processing 406. The packets are then prioritized 408 and 410 and provided 410 to queue memory 226 prior to being distributed 412 to the appropriate egress port in step 412.

Qualified packets satisfying the mirror classification criteria 452 are selected 416 for additional processing in the preferred embodiment. The processing includes duplication 420 of the qualified packets by the replicator 210. A duplicated packet, including the original address information of the ingress packet, is preferably encapsulated with the MFE header and MFE footer in the encapsulation module 220. In the preferred embodiment, the encapsulating step 422 generally comprises the steps of appending 424 an MFE header including the destination address of the target network device, data 452, provided by the network administrator during the step of inputting classification criteria 414, and appending 426 an MFE FCS 426 to account for the increased length of the MFE packet.

In the preferred embodiment, the duplication and encapsulation of the qualified packets occurs in the frame forwarding module 206, although one skilled in the art will appreciate that there are numerous alternative ways of implementing the method in hardware, software, firmware, or a combination thereof. One skilled in the art will also recognize that a plurality of qualified flows may be defined in step 414, each of which may have a unique target network device.

The encapsulated packets are then generally prepared 428 for OSI model layer 3 forwarding based upon the address information in the MFE header, as illustrated in step 428. The original header of the un-encapsulated packets, although retained in the encapsulated MFE packet, is of no significance subsequent to encapsulation. The encapsulated MFE packets are preferably routed towards the target network device based upon standard IP or comparable protocol that can forward frames across a network of heterogeneous devices. The encapsulated packets are prioritized 430 and queued 432 at queue memory 226 prior to being transmitted 434 on the appropriate egress port.

Figure 5:
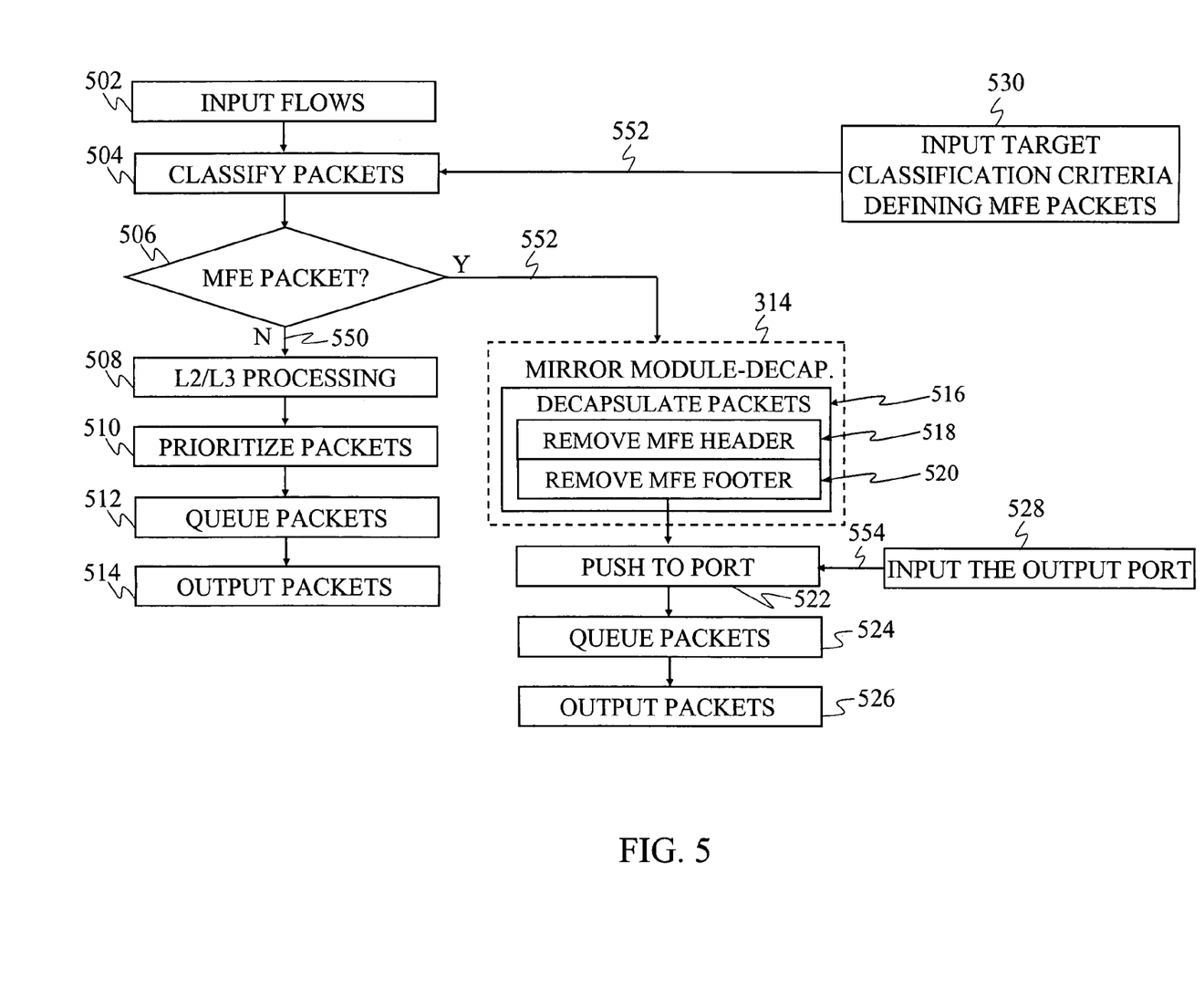
FIG. 5 is a method by which the target network device processes packets according to the preferred embodiment of the present invention.

Referring to FIG. 5, a method by which the target network device processes packets according to the preferred embodiment is illustrated. A target network device, the TND 110 in the preferred embodiment, receives 502 ingress traffic from a plurality of ingress ports. The individual packets are classified 504 and processed according to the addressing tables in the lookup cache 324. As illustrated in decision block 506, non-MFE packets that fail to satisfy the "target classification criteria" 552 provided 530 by the network administrator are processed using conventional methods, including layer 2 switching and layer 3 routing 508.

If the TND 110 also serves as a source network device for an additional mirrored flow, the classification 504 may also be used to identify those packets that satisfy mirror classification criteria consistent with the process illustrated in FIG. 4. The non-MFE conventional packets are then prioritized 510 and queued 512 prior to being transmitted on the appropriate egress port 508.

Mirrored MFE packets, however, are identified as part of the classification step 504 using the target classification criteria 552 provided to the TND 110 by the network administrator 102. In the preferred embodiment, the incoming MFE packets are culled 506 from the normal processing channels and directed 552 to the mirror module 314 where they undergo de-encapsulation.

After segregating the MFE packets from the conventional traffic flow, the process of de-encapsulation 516 preferably reverses the encapsulation process that occurred in the encapsulation module of the source network device. In the preferred embodiment, de-encapsulation entails removing the MFE header 518 and removing the MFE footer 520. The output of the mirror module 314 is thus a de-encapsulated packet that is an exact mirror copy of, or otherwise substantially similar to, the unmodified ingress packet received by the SND 106.

The de-encapsulated packets are pushed 522 towards the particular egress port 554 specified 528 by the network administration. The de-encapsulated packets are then buffered 524 in queue memory 326 prior to being transmitted 526 to the designated egress port. One skilled in the art will recognize that the de-encapsulated packets in this embodiment do not undergo conventional switching operations since the layer 2 and layer 3 addressing information of the original packet would cause the packet to be routed to the packets original destination instead of the designated egress port of the TND 110.

The MFE header for encapsulating a mirrored flow packet may take any of a number of forms. In the first preferred embodiment immediately below, the MFE header includes the IP destination address of the TND 110, and the MFE packets are transmitted between the SND 106 and the TND 110 using conventional IP routing

| | |
|---|---|
| Octet 1-6 | Destination MAC address; |
| Octet 7-12 | Source MAC Address; |
| Octet 13, 14 | Ethertype, IP = 0x00000800; |
| Octet 15 | Version, preferably 4 bits, and Internet Header Length, preferably 4 bits, used to specify the length of the IP packet header in 32 bit words; |
| Octet 16 | Type of Service/DiffServ; |
| Octet 17, 18 | Total Length of Frame; |
| Octet 19, 20 | Identification, preferably 16 bits, used to identify the fragments of one datagram from those of another, is a unique value for a given source-destination pair and protocol for the time the datagram will be active in the internet system; |
| Octet 20, 21 | Flags, preferably 3 bits, and Fragment Offset, preferably 13 bits; |
| Octet 23 | Time to Live (TTL); |
| Octet 24 | Protocol, e.g. UDP = 17; |
| Octet 25, 26 | IP Header Checksum; |
| Octet 27-30 | IP Source Address of the Source Network Device; |
| Octet 31-34 | IP Destination Address of the Target Network Device; |
| Octet 35-37 | Options; |
| Octet 38 | Pad; |
| Octet 39, 40 | Source Port, preferably 50000; |
| Octet 41, 42 | Destination Port, preferably 50000; |
| Octet 43, 44 | Length of the Mirrored Frame with UDP Header; |
| Octet 45, 46 | Checksum with the UDP Header and Mirrored Frame; |
| Octet 47-52 | Destination MAC Address of the Original Mirrored Frame; |
| Octet 53-58 | Source MAC Address of the Original Mirrored Frame; and |
| Octet 59- | Remainder of Mirrored Frame. |

In the second preferred embodiment immediately below, the MFE header includes an MPLS label of the TND 110, and the MFE packets transmitted between the SND 106 and the TND 110 using a label switch path established prior to transmission of the MFE packets.

| | |
|---|---|
| Octet 1-6 | MAC DA of next hop device; |
| Octet 7-12 | MAC SA of source device; |
| Octet 13-14 | ETHERTYPE, MPLS = 0x8847 |
| Octet 15-18 | MPLS Label 1 - identifying target device; |
| Octet 19-22 | MPLS Label 2 - identifying mirrored traffic; and |
| Octet 23- | Remainder of Mirrored Frame. |

Figure 6:
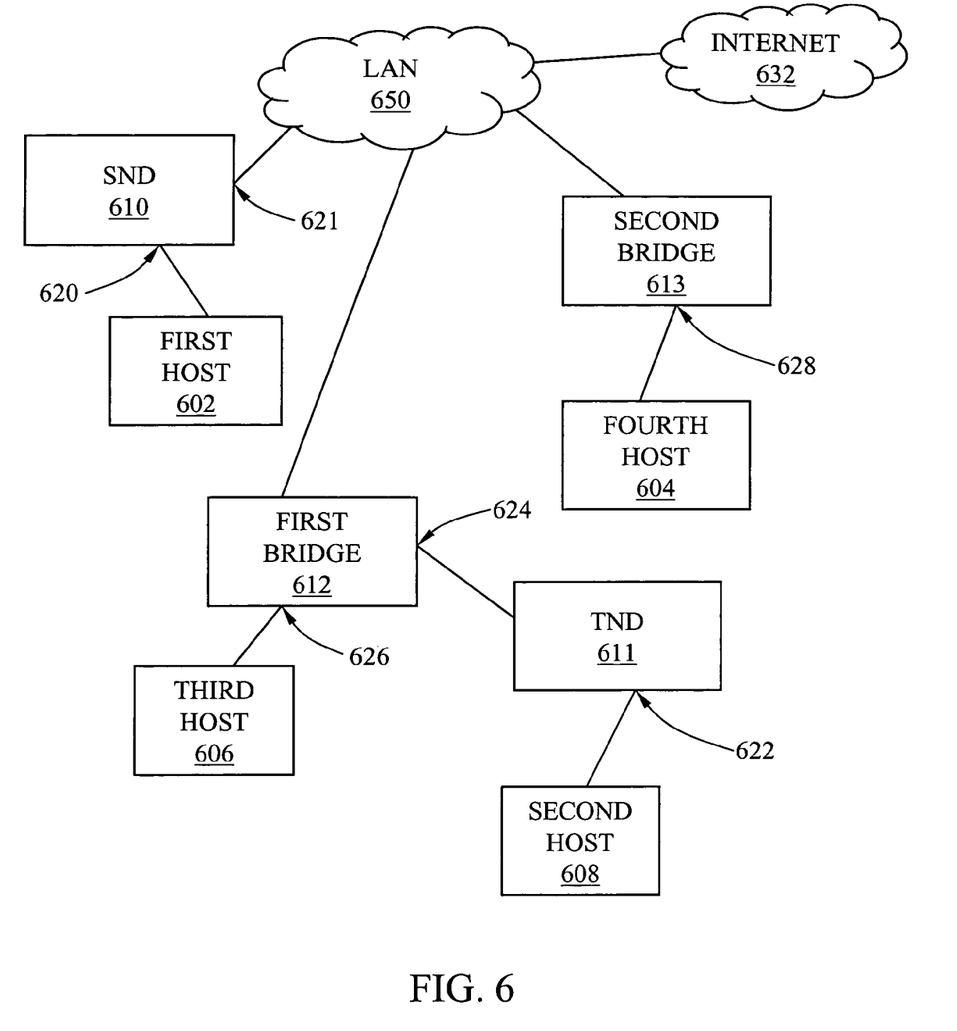
FIG. 6 is local area network over which the present invention may be used to transmit mirrored traffic, according to one embodiment of the present invention.

Illustrated in FIG. 6 is a local area network demonstrating the use of an MFE header to distribute mirrored traffic within a VLAN, for example. In this embodiment, mirrored PDUs are transmitted from a host by means of a source network device to one or more recipients by means of one or more target network devices using a VLAN reserved for such traffic, herein referred to as a network monitoring VLAN (NMV). In this embodiment, mirrored PDUs are transmitted from a first host 602 to a second host 608 by means of a plurality of network nodes including the SND 610 and a first TND 611. The SND 610 as well as the TND 611 are VLAN-aware devices. The NMV is appended to the mirrored PDUs at the ingress port of the first SND 610, the mirrored PDUs are forwarded through the LAN, the NMV tag removed at each of the one or more TNDs 611, and the duplicate of the PDUs originally received by the SND then forwarded to a designated application or egress port at the TND 611. Mirrored traffic from the SND 610 may be sent concurrently with mirror traffic from one or more other source network devices including the second SND 613.

To mirror the ingress traffic received on port 620, for example, one or more VLAN tagging rules are installed on the SND 610, causing the ingress traffic to be duplicated and the duplicate frames tagged with an 802.1Q VLAN tag having the VLAN ID (VID) associated with the NMV. The port from which ingress traffic is received is referred to herein as a mirrored port, although one skilled in the art will appreciate that the SND 610 may be adapted to select and mirror one or more flows received on one or more ports of the SND 610. A VLAN association rule that causes the frames with the NMV tag to be transmitted from each port that is in the NMV member set, including port 621, is also installed on the SND 610. A second VLAN tagging rule is also installed on the TND 611, for example, causing the NMV tag of the mirror traffic to be removed, i.e., popped, and the frames forwarded to the designated egress port 622, referred to herein as a mirroring port. One or more VLAN association rules identifying all ports in the member set for the NMV are also installed on the intermediate nodes interconnecting the SND 610 and the TND 611, thus causing the first bridge 612, for example, to forward the NMV tagged frames from the SND 610 to be forwarded in the direction of the TND 611 via one or more egress ports 624. Upon receipt at the TND 611, the duplicate copy of one or more frames originating with the SND 610 are regenerated and transmitted to the second host 608 for analysis or inspection, for example.

In accordance with some embodiments of the invention, the mirrored traffic from the SND 610 may also be distributed to any node that is a member of the NMV, including a plurality of target network devices. Using a VLAN tag popping rule similar to that installed on the TND 611, the first bridge 612, for example, may be converted to a target network device adapted to forward mirrored traffic to the third host 606. In particular, a VLAN association rule is installed on the first bridge 612 to associate port 626 with the NMV, thereby converting port 626 into a mirroring port. Thereafter, mirrored traffic from the SND 602 is forwarded to the interface associated with the mirroring port 626, the NMV tag removed, and the duplicate frames transmitted to the third host 606. Using the present embodiment, the mirrored traffic may be concurrently transmitted to any number of target nodes in the network.

In accordance with some embodiments of the invention, traffic at a plurality of nodes may be concurrently mirrored and the mirrored traffic distributed to one or more target network devices. If one or more VLAN tagging rules are also installed on the second bridge 613 similar to that installed in the SND 610, for example, one or more traffic flows at port 628 from the fourth host 604 may be mirrored and distributed to one or more target devices across the LAN 650. As discussed above, the VLAN tagging rules cause frames received on the mirrored port 628 to be duplicated and the duplicate frames tagged with an 802.1 Q VLAN tag having the NMV VID. Thereafter, mirrored traffic from the second bridge 604, now a SND, propagates through NMV concurrently with the mirror traffic from the first SND 602. Although the first host 602 and fourth host 604 are operatively coupled to different nodes, one skilled in the art will appreciate that two such hosts may be coupled to the same source network device by disabling the source learning 252 with respect to two mirrored ports on the same bridge to prevent the NMV tagged traffic originating from each of the mirrored ports from being be transmitted to the other mirrored port. In order to accomplish this, MAC learning is disabled for the NMV (NMV is an acronym for network monitoring VLAN) in the entire network.

The NMV tagging rules installed on the mirrored ports, mirroring ports, and the forwarding ports of the intermediate switching nodes effectively isolate the mirrored traffic from other conventional bridge traffic without disrupting the other bridge traffic. As such, the mirrored ports of the SNDs 610, 613, the mirroring ports of the TNDs 611, 612, and the intermediate switching nodes continue to both receive and forward or route conventional traffic, i.e., non-mirrored traffic, even after being configured to mirror selected flows. In addition, the topology of the LAN 650 is active and the mirrored ports, mirroring ports, and forwarding ports of the intermediate nodes operate in accordance with a link management protocol such as the 802.1D spanning tree protocol.

Figures 7A, 7B:
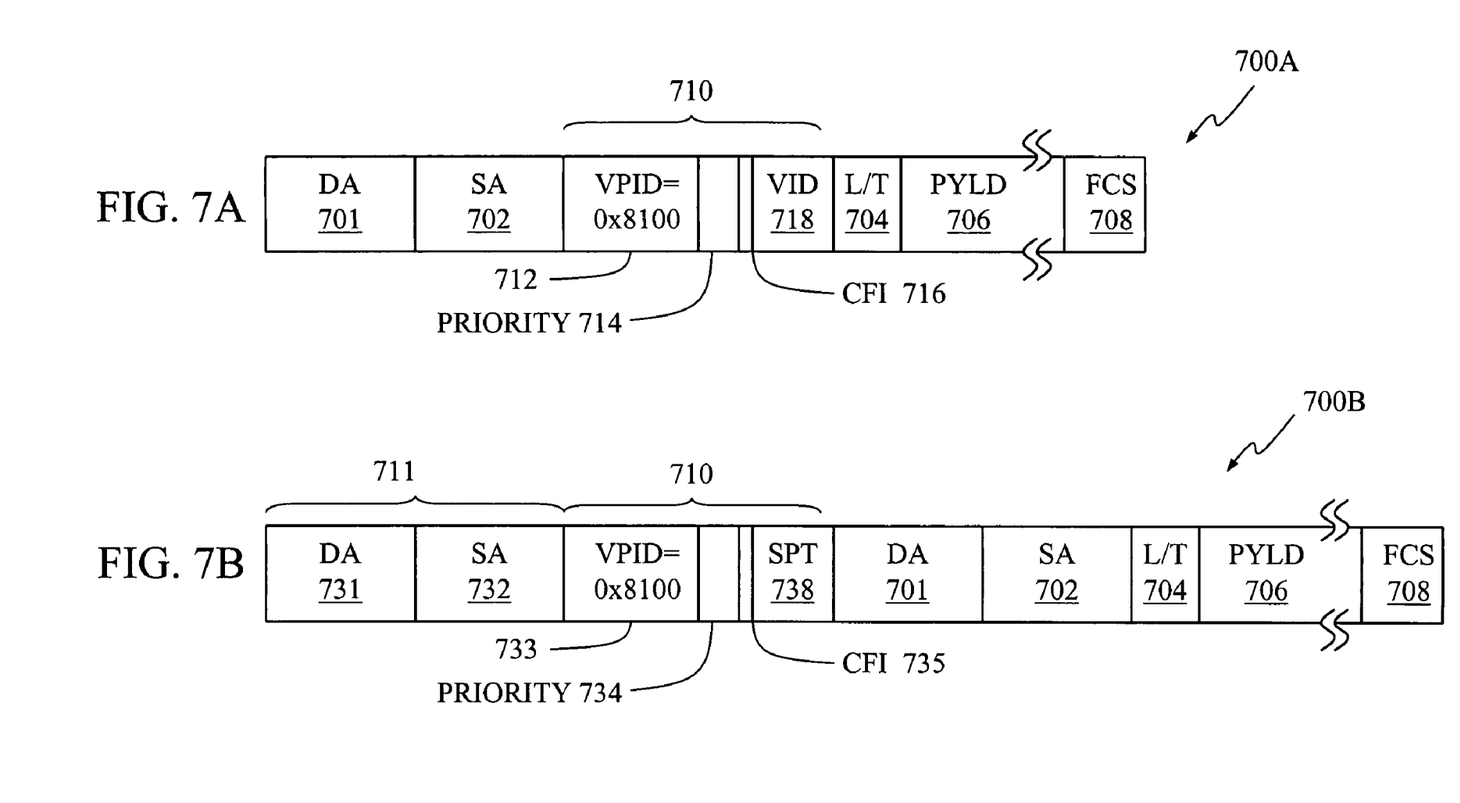
FIGS. 7A-7B are schematic diagrams of frames including a mirrored flow encapsulation header, according to one embodiment of the present invention.

Illustrated in FIG. 7A is a diagram of an exemplary mirrored frame with a VLAN tag stacked onto the frame at the source network device. The frame 700A, preferably an Ethernet frame, includes an NMV tag 710. The NMV tag 710 in the preferred embodiment is an 802.1Q tag 710 inserted after the destination address (DA) 701 and source address (SA) 702 and before the Length/Type field 704 indicating either the number of bytes that are contained in a data field 706 or the frame type ID depending on the frame format type, the user data referred to as the payload 706, and a frame check sequence (FCS) 708 containing a cyclic redundancy check (CRC) value. The 802.1Q tag 710 includes a VLAN protocol identifier (VPID) 712 equal to 8100 in hexidecimal, a 3-bit priority field 714, a canonical format indicator (CFI) 716 indicating the bit ordering of the bytes within the frame, and a 12-bit VID 718 reserved exclusively for mirrored traffic in the LAN.

In accordance with one embodiment of the invention, the source address 702 is the MAC address of the source network device and the destination address 701 is the MAC address of the intended recipient to which it is transmitting. While the NMV tag described above may be employed to mirror frames with user data, control frames including bridge protocol data units (BPDUs) are generally not forwarded by a bridge. Where the network administrator requires control frames to be mirrored as well, the SNDs may be adapted to apply an MFE header 711 to each frame selected to be mirrored, the header further including a mirrored flow address header with a mirrored flow destination address 731 and source address 732. The mirrored flow destination address 731 in the preferred embodiment is a MAC address reserved for mirroring and therefore not associated with any physical node in the LAN 650. The destination address 731 may therefore be used by each of the SNDs to generate mirrored frames 700B and, with the appropriate forwarding rule, cause the intermediate nodes to forward the mirrored frames on each of the ports associated with the NMV with the exception of the port on which it was received. Since both MAC DA and SA are now special addresses, control traffic can be mirrored without it being absorbed by the intermediate devices and the mirrored control traffic switched in the NMV. Once they reach the target network device(s), header 711 and 710 will be popped out before the packets are transmitted to the mirroring port(s).

One skilled in the art will recognize that there are numerous alternative embodiments and frame encapsulation techniques that would achieve the same result with insubstantial changes to the content or organization of the MFE headers described herein.

Although the description above contains many specifications, these should not be construed as limiting the scope of the invention but as merely providing illustrations of some of the presently preferred embodiments of this invention.

Therefore, the invention has been disclosed by way of example and not limitation, and reference should be made to the following claims to determine the scope of the present invention.

We claim:

1. A method of mirroring a traffic flow from a source network device to a target network device for allowing analysis of the traffic flow using the target network device, the method comprising the steps of:

receiving one or more ingress frames of the traffic flow at the source network device;

generating at least one duplicate frame for each of the one or more ingress frames at the source network device in response to determining that the one or more ingress frames satisfy prescribed mirror classification criteria corresponding to information intended to influence said analysis of the traffic flow, wherein each of the one or more ingress frames at least comprises an associated address corresponding to an original designation network device;

appending a virtual local area network (VLAN) tag to the at least one duplicate frame, wherein the VLAN designated the target network device which is different than the original designation network device;

transmitting the one or more ingress frames from the source network device based on the associated address;

transmitting the at least one duplicate frame with the VLAN tag from the source network device towards the target network device based on the VLAN tag;

receiving the at least one duplicate frame with the VLAN tag at the target network device;

removing the VLAN tag from the at least one duplicate frame at the target network device after receiving the at least one duplicate frame at the target network device such that the target network device generates a substantially identical copy of at least one of the one or more ingress frames of the traffic flow received at the source network device; and performing analysis of the at least one duplicate frame received at the target network device using the target network device for accessing the at least one duplicate frame.

2. The method of claim 1, wherein the one or more ingress frames comprise one or more data link layer frames.

3. The method of claim 1, wherein the one or more data link layer frames comprise one or more Ethernet frames.

4. The method of claim 1, wherein the VLAN tag is an 802.1Q tag.

5. The method of claim 1, wherein the VLAN tag comprises a network monitoring VLAN reserved for transmitting at least one mirrored flow.

6. The method of claim 1, wherein the source network device is one of a first set of source network devices adapted to concurrently generate a plurality of duplicate frames and append said VLAN tag to said plurality of frames.

7. The method of claim 1, wherein the target network device is one of a second set comprising a plurality of network devices, wherein the method further comprises the steps of: transmitting the at least one duplicate frame with the VLAN tag from the source network device to each of the plurality of network devices based on the VLAN tag; receiving the at least one duplicate frame with the VLAN tag at each of the plurality of network devices; and removing the VLAN tag from the at least one duplicate frame at each of the plurality of network devices.

8. The method of claim 1, wherein the method further comprises the step of transmitting said generated copy of one or more ingress frames from the target network device to one or more host devices operatively coupled to the target network device.

9. A system adapted to mirror one or more flows between remote network nodes, the system comprising:
   a source network device adapted to:
      receive one or more ingress frames of the traffic flow at the source network device;
      generate at least one duplicate frame for each of the one or more ingress frames at the source network device in response to determining that the one or more ingress frames satisfy prescribed mirror classification criteria corresponding to information intended to influence said analysis of the traffic flow, wherein each of the one or more ingress frames at least comprises an address corresponding to an original designation network device;
      append a virtual local area network (VLAN) tag to the at least one duplicate frame, wherein the VLAN designated the target network device which is different than the original designation network device;
      transmit the one or more ingress frames from the source network device based on the address;
      transmit the at least one duplicate frame with the VLAN tag from the source network device towards the target network device based on the VLAN tag; and
   a source network device adapted to:
      receive the at least one duplicate frame with the VLAN tag at the target network device; and
      remove the VLAN tag from the at least one duplicate frame at the target network device after receiving the at least one duplicate frame at the target network device such that the target network device generates a substantially identical copy of at least one of the one or more ingress frames of the traffic flow received at the source network device thereby allowing analysis of at least a portion of the traffic flow to be performed using the target network device.

10. The system of claim 9, wherein the one or more ingress frames comprise one or more data link layer frames.

11. The system of claim 10, wherein the one or more data link layer frames comprise one or more Ethernet frames.

12. The system of claim 9, wherein the VLAN tag is an 802.1Q tag.

13. The system of claim 9, wherein the VLAN tag comprises a network monitoring VLAN reserved for transmitting at least one mirrored flow.

14. The system of claim 9, wherein the source network device is one of a first set of source network devices adapted to concurrently generate a plurality of duplicate frames and append said VLAN tag to said plurality of frames.

15. The system of claim 9, wherein the target network device is one of a second set comprising a plurality of network devices, and wherein the source network device is further adapted to transmit the at least one duplicate frame with the VLAN tag to each of the plurality of network devices based on the VLAN tag; and wherein the plurality of network devices are adapted to: receive the at least one duplicate frame with the VLAN tag, and remove the VLAN tag from the at least one duplicate frame.

16. The system of claim 9, wherein the target network device adapted to transmit said generated copy of one or more ingress frames to one or more host devices operatively coupled to the target network device.

\* \* \* \* \*